US006437245B1

(12) United States Patent
Hayashi

(10) Patent No.: US 6,437,245 B1
(45) Date of Patent: Aug. 20, 2002

(54) TERMINAL PROCESSING METHOD AND STRUCTURE FOR SHIELD CABLE

(75) Inventor: Hiroyuki Hayashi, Nagoya (JP)

(73) Assignees: Autonetworks Technologies, Ltd., Aichi; Sumitomo Wiring Systems, Ltd., Mie; Sumitomo Electric Industries, Ltd., Osaka, all of (JP)

( * ) Notice: Subject to any disclaimer, the term of this patent is extended or adjusted under 35 U.S.C. 154(b) by 0 days.

(21) Appl. No.: 09/703,842

(22) Filed: Nov. 2, 2000

(30) Foreign Application Priority Data

Nov. 9, 1999 (JP) .......................................... 11-318867

(51) Int. Cl.[7] ...................... H02G 15/02; H01R 13/648; H01R 13/627

(52) U.S. Cl. ......................... 174/74 R; 174/78; 439/96; 439/364

(58) Field of Search ............................ 174/74 R, 75 C, 174/78, 79, 84 R, 88 R, 88 C, 89, 93; 439/96, 97, 92, 98, 364

(56) References Cited

U.S. PATENT DOCUMENTS

| | | | | | |
|---|---|---|---|---|---|
| 3,447,036 | A | * | 5/1969 | Dore et al. | 317/99 |
| 4,489,997 | A | * | 12/1984 | Byrne | 339/13 |
| 5,271,689 | A | * | 12/1993 | Ishii et al. | 403/2 |
| 5,274,570 | A | * | 12/1993 | Izumi et al. | 364/490 |
| 5,315,063 | A | * | 5/1994 | Auclair | 174/78 |
| 5,336,109 | A | * | 8/1994 | Hillbish et al. | 439/540 |
| 5,431,573 | A | * | 7/1995 | Endo et al. | 439/157 |
| 5,468,155 | A | * | 11/1995 | Johnston | 439/98 |
| 5,536,103 | A | * | 7/1996 | Sawada | 403/326 |
| 5,536,904 | A | * | 7/1996 | Kojima et al. | 174/23 |
| 5,564,953 | A | * | 10/1996 | Endo et al. | 439/701 |
| 5,575,667 | A | * | 11/1996 | Mehez et al. | 222/65 |
| 5,741,147 | A | * | 4/1998 | Konoya et al. | 439/189 |
| 5,775,953 | A | * | 7/1998 | Yamanashi et al. | 439/357 |
| 6,085,416 | A | * | 7/2000 | Ikeda | 29/864 |

FOREIGN PATENT DOCUMENTS

JP 6-14437 A * 1/1994 ............ H02G/5/06

* cited by examiner

*Primary Examiner*—Anthony Dinkins
*Assistant Examiner*—William H. Mayo, III
(74) *Attorney, Agent, or Firm*—Oliff & Berridge, PLC

(57) ABSTRACT

The invention relates to terminal processing method and structure for grounding the terminal of a shielding braid wire 34 contained in a shield cable 30. The invention employs first connectors 14A, 14B fixed to members 10A, 10B to be grounded at least upon usage and a second connector 20 coupled to the first connectors by means of a metal bolt 26. The bolt 26 is screwed into a screw hole on the members 10A, 10B side in a state that the terminal of the shielding braid wire 34 is coupled to the bolt 26, whereby the shielding braid wire 34 is coupled to the members 10A, 10B side through the bolt 26 the moment the connector are coupled to each other.

10 Claims, 4 Drawing Sheets

TERMINAL PROCESSING METHOD AND STRUCTURE FOR SHIELD CABLE

BACKGROUND OF THE INVENTION

1. Field of Invention

The present invention relates to terminal processing method and structure for a shield cable including a shielding member such as a shielding braid, a shielding tape, a drain line etc.

2. Description of Related Art

In general, in the shield cable including the shielding member, the shielding member is required to be grounded in order to effectively attain the shielding function thereof. Method and structure for grounding the terminal of the shielding member are known as means for grounding the shielding member. An example of such method and structure is shown in FIG. 5.

A unit casing 80 shown in the figure is arranged to house a control substrate therein, for example, and is grounded at least upon usage. A first connector 82 is fixed to the outer wall of the casing 80 by means of bolts 84. A bolt passing cylindrical portion 87 shaped so as to pass through a second connector in an axial direction thereof is formed at the second connector 86 which is coupled to the first connector 82. A bolt 88 is passed through the bolt passing cylindrical portion 87 and an end portion thereof is screwed into a screw hole (not shown) provided at the unit casing 80 side, whereby both the connectors 82, 86 are fixed (fastened) in a coupling state to each other.

A shield cable 90 includes a plurality of electric wires 91 and shielding braid covering them. Terminals of the electric wires 91 are coupled to terminals incorporated in the second connector 86, respectively. End portions of the shielding braid are twisted in a line shape to form a shielding braid wire 92. A rod-shaped coupling metal member 93 is fixed to a terminal of the shielding braid wire 92.

The connectors 82, 86 are arranged so as to be covered by a metal connector cover 94. A metal member press-in portion 96 in which the coupling metal member 93 is inserted with pressure is formed at a suitable portion on an inner surface of the connector cover 94. Attachment lug portions 98 having bolt passing through holes 97 are formed at a peripheral portions of the connector cover 94 so that bolts 100 can be inserted through the bolt passing through holes 97.

According to this structure, the connectors are coupled and the shielding braid wire 92 is grounded by the following procedure.

1) The end portion of the bolt 88 is screwed into the screw hole of the casing 80 while provisionally fitting the second connector 86 to the first connector 82 and inserting the bolt 88 into the bolt passing cylindrical portion 87 of the second connector 86, whereby the connectors 82 and 86 are coupled to each other.

2) The coupling metal member 93 fixed to the terminal of the shielding braid wire 92 is inserted with pressure into the metal member press-in portion 96. Then, the bolts 100 are screwed into the screw holes (not shown) provided at the unit casing 80 side through through holes 83 provided at the first connectors 82 while inserting the bolts 100 through the bolt passing through holes 97 formed at the attachment lug portions 98 of the connector cover 94. Thus, the connector cover 94 is fixed to the casing 80 and further the connector cover 94 is grounded through the bolts 100 and the casing 80. As a result, the shielding braid wire 92 being in an electrically coupled state to the connector cover 94 through the coupling metal member 93 is also grounded.

However, the configuration and the method shown in FIG. 5 have the following problems to be solved.

(1) In order to ground the shielding braid wire 92, it is required to form the metal member press-in portion 96 at the connector cover 94 and to electrically couple the connector cover 94 to the casing 80 side through the bolts 100. Thus, the configuration of the connector cover 94 becomes complicate and the number of the parts becomes large. Further, the metal member with electric conductivity must be necessarily employed as the connector cover 94. Thus, the connector cover 94 must not be eliminated and the material thereof is limited remarkably. Accordingly, it is impossible to employ light-weighted composite resin, for example, as the material of the connector cover 94.

2) In order to ground the shielding braid wire 92, it is required firstly to insert with pressure the coupling metal member 93 fixed to the terminal of the shielding braid wire 92 into the metal member press-in portion 96 of the connector cover 94 and to fix the connector cover 94 to the casing 80 by the bolts 100 while holding the press-in state of the coupling metal member 93. Such a procedure is very complicated and troublesome.

SUMMARY OF THE INVENTION

The invention has been made in view of the aforesaid circumstances and an object of the invention is to provide method and structure capable of grounding the shielding member of a shield cable easily with simple configuration.

In order to solve the aforesaid problems, the invention is a method of processing a terminal of a shielding member contained in a shield cable by utilizing:

- a first connector fixed to a member grounded at least upon usage; and
- a second connector having a terminal coupled to an electric wire contained in the shield cable, the second connector fastened to the first connector by means of a metal bolt,
- a method of processing a terminal of the shield cable is arranged in that the bolt is screwed into a screw hole provided at the member to be grounded while passing the bolt through the first connector in a state that the terminal of the shield cable is electrically coupled to the bolt, whereby the first connector and the second connector are coupled to each other and the shielding member is electrically coupled to the member to be grounded through the bolt.

Further, the invention is a terminal processing structure for a shield cable having an electric wire and a shield member comprising:

- a member grounded at least upon usage;
- a screw hole formed at the member;
- a first connector fixed to the member;
- a second connector having a bolt passing through portion forming a bolt passing through hole, and the second connector having a terminal; and
- a metal bolt,
- wherein a terminal of the electric wire is coupled to the terminal of the second connector;
- a terminal of the shielding member is electrically coupled to the metal bolt;
- the metal bolt is passed through the bolt passing through hole and screwed into the screw hole thereby coupling the first connector and the second connector to each other.

According to these method and structure, the shielding member can be electrically coupled (that is, grounded) easily to the member grounded with the simple configuration by effectively using the metal bolt for combining the first connector and the second connector.

Though a particular means holding the connection between the terminal of the shielding member and the metal bolt is not required, when the terminal of the shielding member or a coupling metal member provided at the terminal of the shielding member is sandwiched and fixed between the bolt passing through portion and a head portion of the metal bolt, the coupling state between the shielding member and the metal bolt can be maintained surely without utilizing a particular fixing means.

In particular, according to the configuration in which a coupling metal member configured so as to fit to the bolt from an outside thereof is provided at the terminal of the shielding member and the coupling metal member is sandwiched and fixed between the bolt passing through portion and the head portion of the bolt, the shielding member can be coupled to the bolt in a more stable state as compared with the configuration that the terminal of the shielding member is directly sandwiched between the bolt passing through portion and the head portion of the bolt, for example.

DETAILED DESCRIPTION OF PREFERRED EMBODIMENTS

A preferred embodiment of the invention will be explained based on FIGS. 1 to 4.

In this embodiment; "a member to be grounded at least upon usage" in the invention corresponds to a pair of connector coupling portions 10A, 10B integrally formed with a cylinder head. First connectors 14A, 14B are incorporated within the connector coupling portions 10A, 10B, respectively. The first connectors 14A, 14B are coupled to respective electromagnetic control valves within the cylinder head so that the first connectors distribute signals to these electromagnetic control valves.

However, the "member to be grounded at least upon usage" in the invention is not limited to such engine parts but may be applied widely to the members grounded at least upon usage such as a casing for a control substrate, for example.

The first connectors 14A, 14B are fixed to outer walls of the connector coupling portions 10A, 10B by means of bolts 12, respectively. Hoods 15 opened toward an outside are formed at the housings of the first connectors 14A, 14B, respectively. Many male terminals 16 (FIG. 2) are disposed at an inside of each of the hoods 15.

Figure 1:
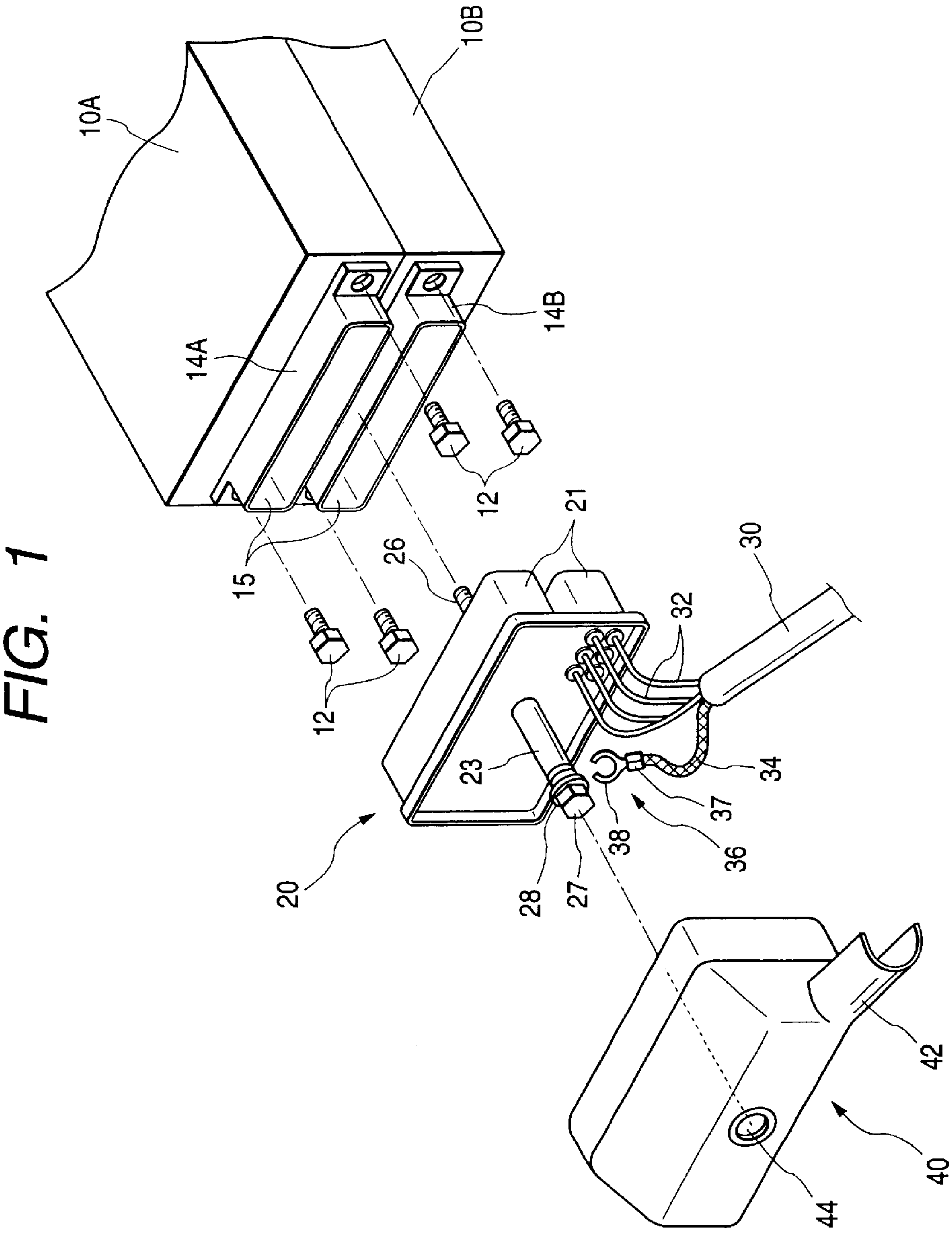
FIG. 1 is an exploded perspective view of the terminal processing structure for a shield cable according to an embodiment of the invention.
Figure 2:
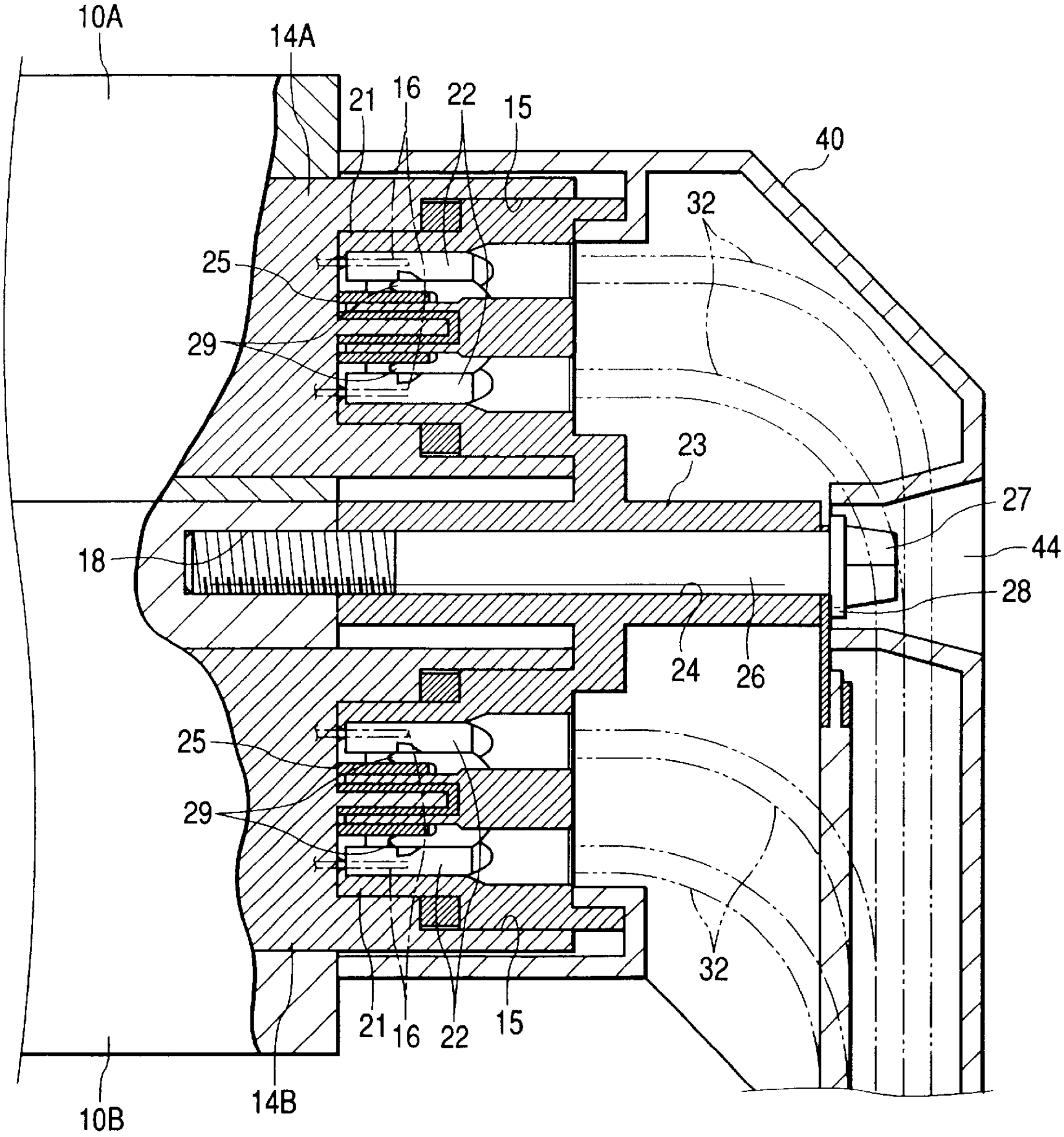
FIG. 2 is a partially cutaway side view showing the terminal processing structure according to the embodiment.
Figure 3:
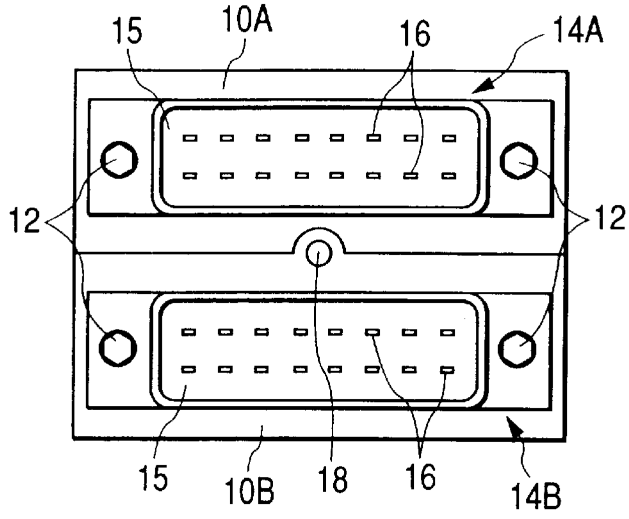
FIG. 3 is a front view showing connector coupling portions and first connectors to be fixed to these connector coupling portions according to the terminal processing structure of the embodiment.

As shown in FIGS. 2 and 3, the connector coupling portions 10A, 10B are disposed in a laminated manner in a vertical direction. The first connectors 14A, 14B fixed to the connector coupling portions 10A, 10B are also disposed in a laminated manner in the vertical direction. A single second connector 20 is coupled to the first connectors 14A, 14B.

Within a housing of the second connector 20, a pair of fitting convex portions 21 disposed in a vertical direction to be fitted into the hoods 15 are formed, respectively. A terminal housing chamber is formed within each of the fitting convex portions 21 and female terminals 22 are fixed within each of the terminal housing chambers as shown in FIG. 2. These female terminals 22 are fitted into the male terminals 16, respectively.

Flexible lances 29 as shown in FIG. 2 are formed within each of the terminal housing chambers of the fitting convex portions 21. A retainer 25 as shown in FIG. 2 is attached to each of the fitting convex portions 21 from the front side thereof (from the left side in FIG. 2) so that the lances 29 are forced in such a configuration to engage the female terminals 22, respectively.

A bolt passing cylindrical portion 23 shaped so as to pass through the second connector 20 in an axial direction thereof is formed at a center portion of the second connector 20. A bolt passing through hole 24 capable of passing a metal bolt 26 therethrough is formed at the bolt passing cylindrical portion 23. The bolt 26 includes a head portion 27 having a different shape in section and being capable of being operated to rotate by means of a tool. The bolt also includes, at a lower portion of the head portion 27, a brim portion 28 having a diameter larger than that of other portions of the bolts 26.

A screw hole 18 is formed at a center portion of an upper area (that is, a portion between the first connectors 14A and 14B) of the lower side connector coupling portion 10B. The screw hole 18 is arranged in a manner that an end portion of the bolt 26 passed through the bolt passing through hole 24 is inserted therein in a screwed and engaged state.

A shield cable 30 according to the embodiment includes many electric wires 32 and shielding braid (shielding member) covering these electric wires 32. End portions of the shielding braid are twisted in a line shape to form a shielding braid wire 34. A coupling metal member 36 is fixed to a terminal of the shielding braid wire 34.

Figure 4A:
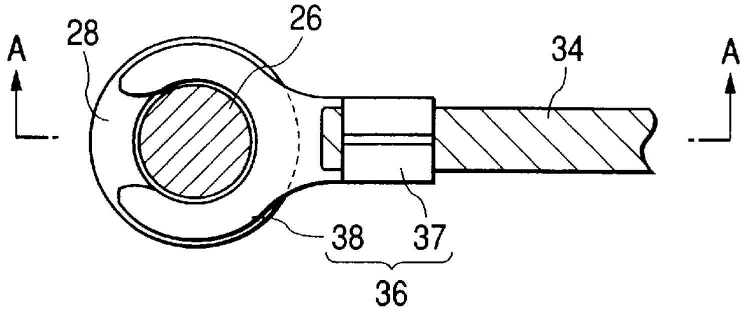
FIG. 4A is a sectional view cut along a line B—B in FIG. 4B and is a sectional plan view showing the coupling state between a coupling metal member and a metal bolt used in the terminal processing structure of the embodiment.
Figure 4B:
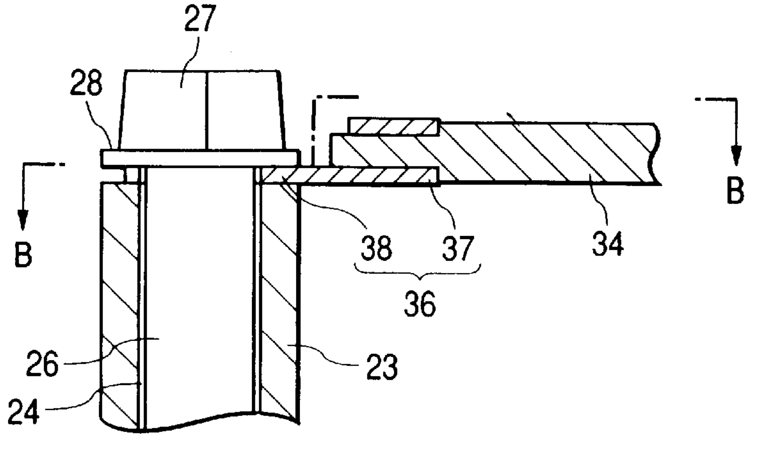
FIG. 4B is a sectional view cut along a line A—A in FIG. 4A.

As shown in FIGS. 4A and 4B, the coupling metal member 36 integrally comprises a crimping portion 37 and a clip portion 38. The crimping portion 37 is crimped and fixed to the terminal of the shielding braid wire 34 by means of a caulking means etc. thereby to electrically couple the coupling metal member 36 and the shielding braid wire 34. The clip portion 38 is arranged in a thin plate shape and in a plane shape (almost C-shape in the example shown in the figure) so that the clip portion can fit in a shaft portion of the bolt 26 from an outside thereof.

The connectors 14A, 14B, 20 are protected from an outside by a connector cover 40. The connector cover 40 includes an electric wire covering portion 42 covering a terminal portion of a shield cable 30 in addition to a main body portion covering the connectors. A through hole 44 for avoiding an interference with the head portion 27 of the bolt 26 is formed at a center portion of the connector cover 40.

The terminal processing method for the shield cable 30 according the aforesaid configuration of the terminal processing structure will be explained.

1) The female terminals 22 of the second connector 20 are fixed in a coupled state to the terminals of the electric wires 32 of the shield cable 30, and then these female terminals 22 are inserted into the terminal housing chambers of the second connector 20, and the retainers 25 are attached, whereby the female terminals 22 are fixed within the terminal housing chambers, respectively.

In the invention, the coupling structure between the electric wires 32 and the female terminals 22 is not limited to a particular type. The conventional known various types of means such as a structure for crimping a barrel formed at the female terminal 22 to the terminal of the electric wire, a structure for coupling the electric wire to a pressing blade with pressure, a structure employing the ultrasonic welding etc. may be applied as it is as the coupling structure of the invention. Further, the structure for fixing the female terminals 22 within the terminal housing chambers of the second connector 20 is not limited to a particular type. It is possible, depending on the structure of the second connector, to couple the electric wires 32 of the shield cable 30 to the female terminals in a state where the female terminals 22 are incorporated in the housing of the second connector in advance.

2) The fitting convex portions 21 of the second connector 20 are provisionally fitted into the hoods 15 of the first connectors 14A, 14B, respectively.

3) The bolt 26 is inserted into the bolt passing through hole 24 of the bolt passing cylindrical portion 23, and then the clip portion 38 of the coupling metal member 36 fixed to the terminal of the shielding braid wire 34 is fitted on an external surface of the shaft portion of the bolt 26. In this state, the bolt 26 is operated to rotate thereby to be screwed and inserted into the screw hole 18 on the connector coupling portion 10B side. That is, the bolt 26 is screwed into the screw hole 18 of the connector coupling portion 10B while passing the bolt 26 through the second connector 20.

In accordance with the fastening of the bolt 26, the fitting state between the male terminals 16 of the first connectors 14A, 14B and the female terminals 22 of the second connector 20 proceeds, and finally the first connectors 14A, 14B and the second connector 20 are fastened to each other. Simultaneously, the flat clip portion 38 of the coupling metal member 36 is sandwiched between the brim portion 28 of the head portion 27 of the bolt and an end surface of the bolt passing cylindrical portion 23 (the state shown in FIG. 4(*b*)). Accordingly, the coupling metal member 36 is fixed to the bolt 26 in a contacting state therewith, so that the shielding braid wire 34 is placed in a state that it is electrically coupled to the connector coupling portions 10A, 10B side through the coupling metal member 36 and the metal bolt 26. Thus, the shielding braid wire 34 is automatically grounded by grounding the connector coupling portions 10A, 10B.

Figure 5:
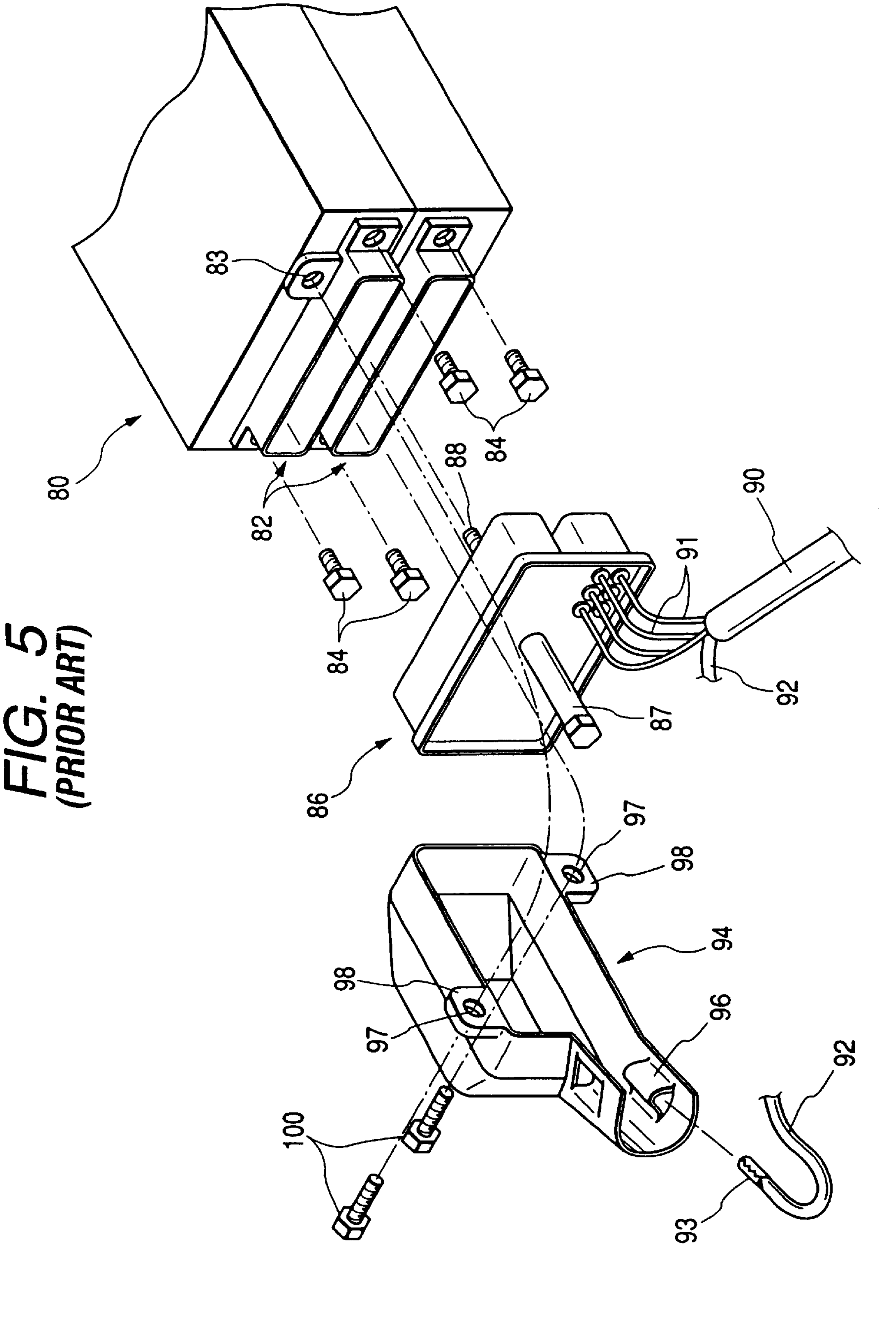
FIG. 5 (PRIOR ART)
FIG. 5 is an exploded perspective view showing an example of the conventional terminal processing structure for a shield cable.

According to the structure and method of the embodiment, since the terminal of the shielding braid wire 34 is grounded on the connector coupling portions 10A, 10B side by effectively using the metal bolt 26 for coupling the connectors, unlike the conventional structure shown in FIG. 5 it is not required to add a particular structure to the connector cover nor to perform complicated procedures. Thus, according to the embodiment, the shielding member can be grounded by such a simple procedure that the coupling metal member 36 fixed to the terminal of the shielding braid wire 34 is sandwiched between the brim portion 28 of the head portion 27 of the bolt and the end surface of the bolt passing cylindrical portion 23.

Further, unlike the conventional structure shown in FIG. 5, since the connector cover 40 is not used as the coupling medium, the structure and the material of the connector cover 40 is not restricted. Furthermore, the connector cover 40 may be eliminated depending on the case.

The invention is not limited to the aforesaid embodiment and the following embodiment may be employed, for example.

Although the aforesaid embodiment shows the example where the single second connector 20 is coupled to a plurality of the first connectors 14A, 14B, the invention may be applied to a case where the first connectors and the second connectors are coupled in one to one correspondence. The invention can of course attain the same effect as the aforesaid embodiment in a case where the terminals of the first connector side are male terminals and the terminals of the second connector side are female terminals.

The "terminal of the shielding member," according to the invention is not limited to the shielding braid wire 34 formed by twisting the shielding braids as shown in the figure. For example, the terminal of the shielding member may be arranged in a manner that the terminal of a drain wire disposed within the shield cable 30 so as to contact to the shielding braid is coupled to the bolt for coupling connectors. Further, the shielding member is not limited to the shielding braid but may be a laminated tape including shielding metal foil, for example.

It is possible to eliminate the coupling metal member 36 shown in FIG. 4 and to fix the terminal of the shielding member directly to the bolt 26. However, the shielding member can be coupled to the bolt 26 in a more stable state by employing the coupling metal member 36 having the clip portion 38 capable of being fitted on the external surface of the bolt 26 as shown in the figure.

In the invention, the means for fixing the terminal of the shielding member to the bolt is not limited to a particular type. For example, the terminal of the shielding member may be pasted on the bolt by means of a tape etc. However, by employing a method that the coupling metal member 36 of the terminal of the shielding member or the terminal itself is sandwiched between the head portion of the bolt 26 and the bolt passing cylindrical portion 23 as shown in the figure, the coupling state between the terminal of the shielding member and the bolt can be maintained surely without employing a particular fixing means.

As described above, since the invention is arranged in a manner that the terminal of the shielding member of the shield cable is electrically coupled to the member to be grounded by utilizing the metal bolt for coupling the connectors to each other, the invention is advantageous in that the shielding member of the shield cable can be grounded easily with the simple configuration.

What is claimed is:

1. A terminal processing structure adapted to a shield cable having an electric wire and a shield member comprising:

a member grounded at least upon usage;

a screw hold formed at the member;

a first connector fixed to the member;

a second connector having a bolt through hole, the second connector having a terminal; and a metal bolt for connecting the first connector and the second connector, wherein an end of the electric wire is grounded and electrically connected to the terminal of the second connector;

an end of the shielding member is electrically and physically connected to the metal bolt;

the metal bolt is passed through the bolt through hole and screwed into the screw hole to connect the first connector and the second connector to each other, so that the metal bolt electrically and physically connects the first connector and the second connector.

2. The terminal processing structure adapted to a shield cable according to claim 1, wherein the electric wire is electrically connected to a terminal provided at the first connector.

3. The terminal processing structure adapted to a shield cable according to claim 1, further comprising a coupling metal member configured to fit to the metal bolt from an outside thereof, the coupling metal member provided at an end of the shielding member wherein the coupling metal member is sandwiched between the bolt passing through portion and a head portion of the metal bolt.

4. A method of processing a terminal of a shield cable utilizing a first connector fixed to a member grounded at least upon usage and a second connector having a terminal connected to an electric wire included in the shield cable, the second connector fastened to the first connector by means of a metal bolt, the method comprising:

screwing the metal bolt into a screw hole provided at the member to be grounded while passing the metal bolt through the second connector and electrically connecting a terminal end of the shield cable to the metal bolt wherein the first connector and the second connector are connected to each other by the metal bolt and a shielding member included in the shield cable is connected to the terminal end of the shield cable that is physically connected to the bolt and electrically connected to the member to be grounded through the bolt.

5. The method according to claim 4, characterized in that the terminal end connected to the shielding member of the shield cable is sandwiched and fixed between a bolt passing through a portion provided at the second connector and a head portion of the metal bolt.

6. The method according to claim 4, characterized in that a coupling metal member is provided at the terminal end of the shielding member and is sandwiched between a bolt passing through a portion provided at the second connector and a head portion of the metal bolt.

7. A method of processing a terminal of a shielding cable comprising the steps of:

providing a first connector on a grounded member;

passing a bolt through a second connector;

screwing the bolt into a screw hole provided at a grounded member to connect the first connector with the second connector;

electrically and physically connecting a shielding member of the shielding cable with the grounded member through the bolt.

8. The method according to claim 7, further comprising the steps of electrically connecting an electric wire of the shield cable to a terminal of the second connector to electrically connect the electrical wire of the shield cable to a terminal in the first connector.

9. The method according to claim 7 further comprising the steps of fixing an end of the shielding member between the second connector and a head portion of the bolt.

10. The method according to claim 7 further comprising the steps of sandwiching a coupling member provided at the end of the shielding member between the second connector and the head portion of the bolt.

* * * * *